Nov. 12, 1957  K. L. PRITCHARD  2,812,973
COMMERCIAL VEHICLE BODY WALL CONSTRUCTION
Filed Sept. 27, 1955  4 Sheets-Sheet 1
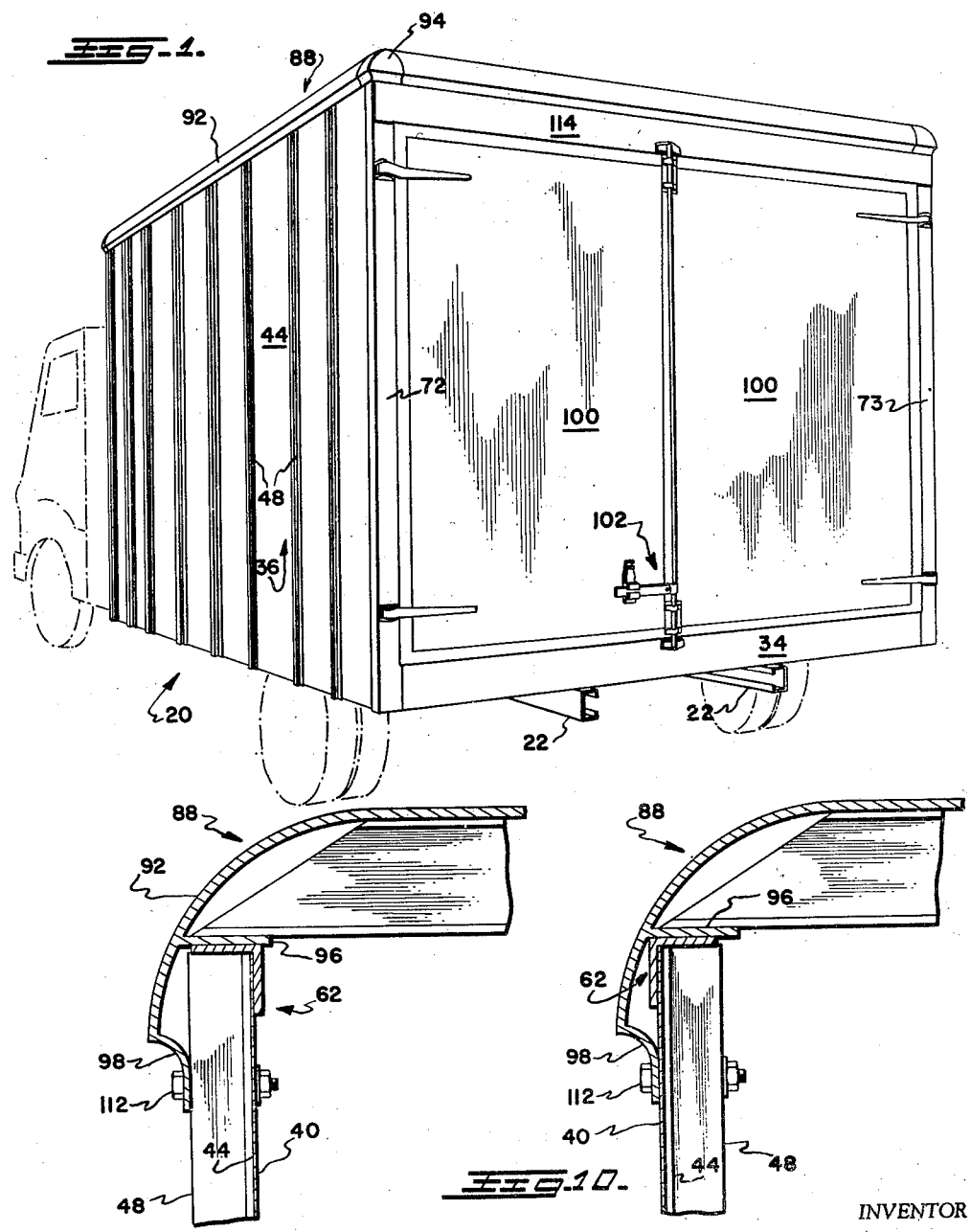
INVENTOR
KENNETH L. PRITCHARD
BY Mead, Browne, Schuyler & Beveridge
ATTORNEYS

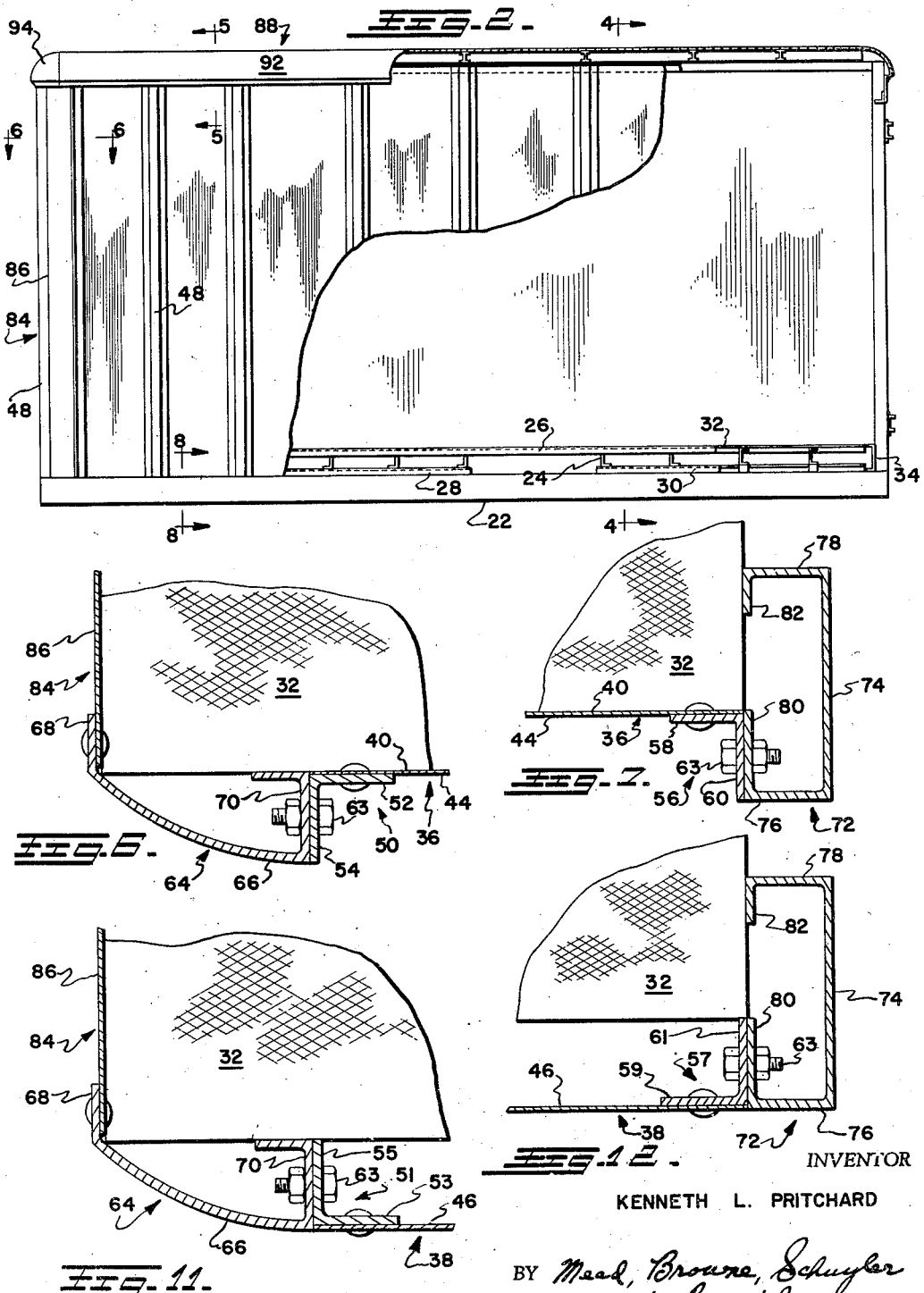

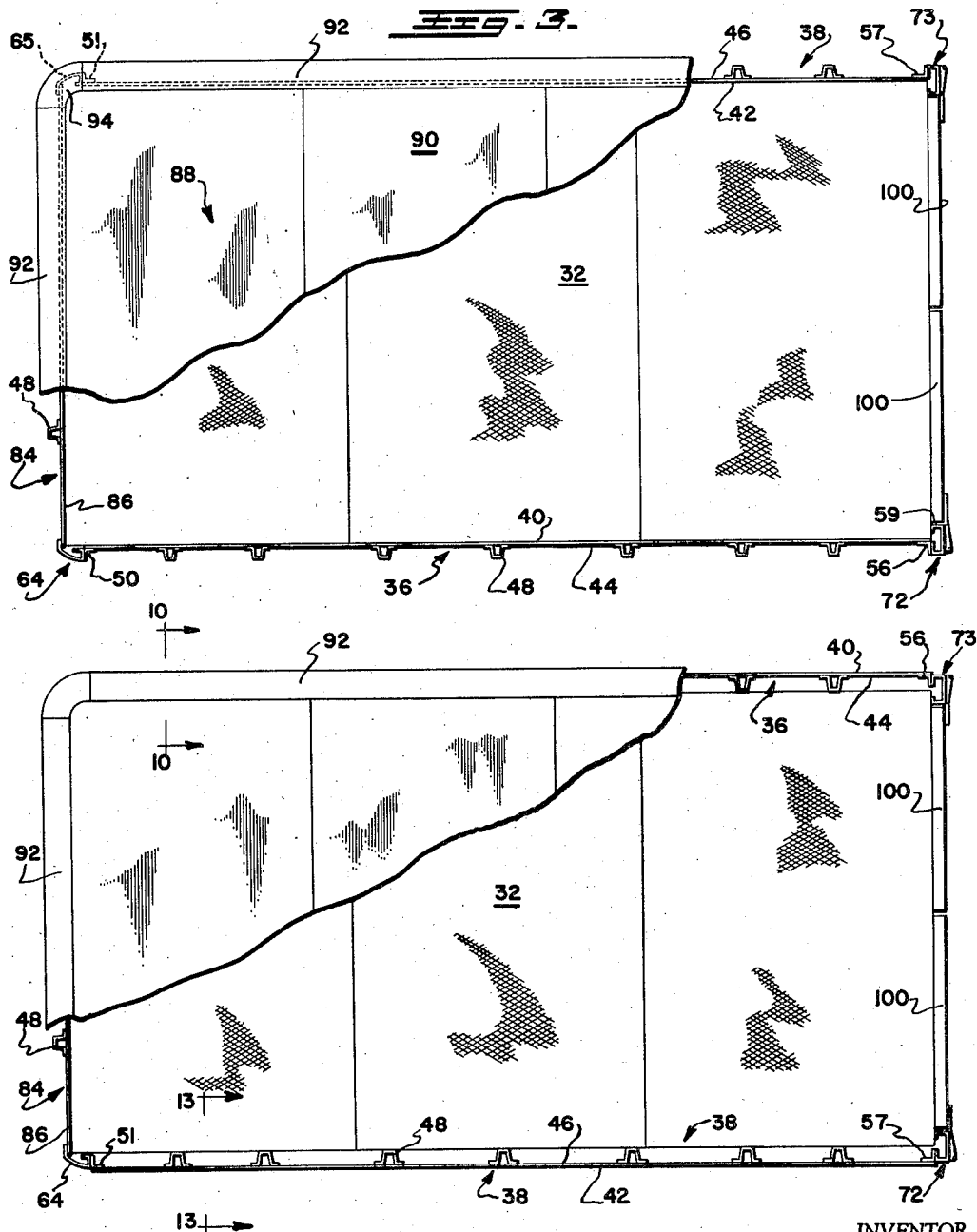

Nov. 12, 1957   K. L. PRITCHARD   2,812,973
COMMERCIAL VEHICLE BODY WALL CONSTRUCTION
Filed Sept. 27, 1955   4 Sheets-Sheet 4
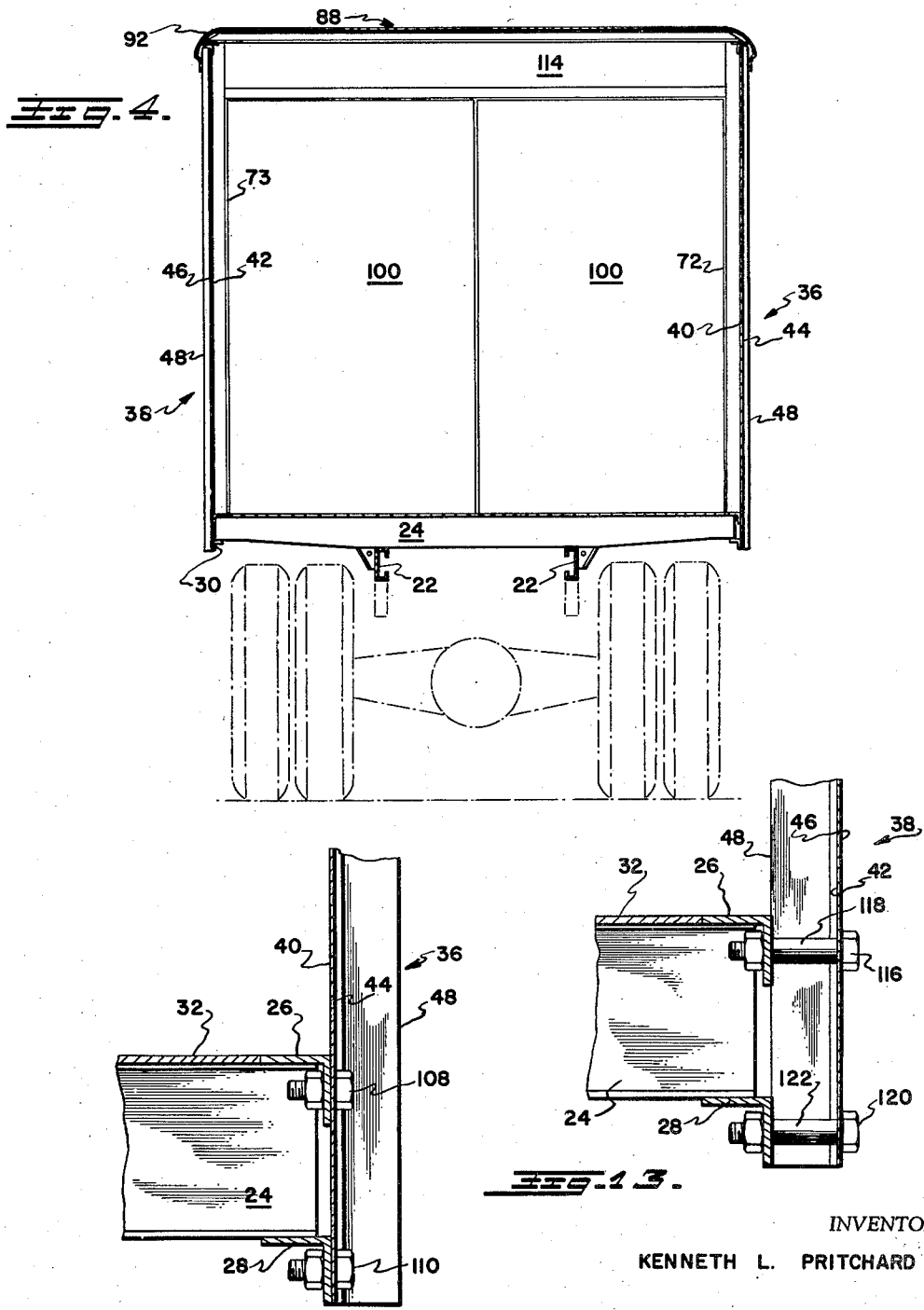
INVENTOR
KENNETH L. PRITCHARD
BY Mead, Browne, Schuyler & Beveridge
ATTORNEYS

United States Patent Office 2,812,973
Patented Nov. 12, 1957

2,812,973

COMMERCIAL VEHICLE BODY WALL CONSTRUCTION

Kenneth L. Pritchard, Ridgely, Md., assignor to The Duralite Manufacturing Company, Ridgely, Md., a corporation of Maryland Application September 27, 1955, Serial No. 536,881

8 Claims. (Cl. 296—28)

This invention relates to vehicle bodies and more particularly to body constructions for commercial vehicles such as trucks, trailers and the like.

Commercial truck bodies of the knock-down type formed of prefabricated panel members and other body components which are joined together by detachable couplings are coming into wide-spread use in the commercial truck field. Such truck bodies are usually made of light-weight metals, such as aluminum, which provide a light body weight permitting the vehicle to carry a heavier pay load for a given truck size than is permissible with heavier truck bodies.

Most of the demountable or knock-down commercial vehicle bodies of light-weight metal utilize side wall panels which are smooth on one surface and which have vertically extending reinforcing side posts or ribs on the opposite surface. In certain types of commercial vehicle usage, it is desirable that the smooth surface of the side wall panels be disposed on the exterior of the vehicle body, with the ribbed surface disposed on the interior of the vehicle body. In other types of vehicle applications, it is desirable that the ribbed surface of the side wall panel members be disposed on the exterior of the vehicle body, with the smooth surface of the panel members disposed on the interior of the vehicle body. Also, it is sometimes desirable to be able to interchange the side panels of a given vehicle body to permit reversing the orientation of the ribbed surface and smooth surface panel portions with respect to the exterior of the vehicle body.

Accordingly, it is an object of this invention to provide a vehicle body of the knock-down or demountable type which can be easily assembled.

It is a further object of this invention to provide a vehicle body of the knock-down type having easily detachable and interchangeable wall panels.

It is still a further object of this invention to provide a vehicle body of the knock-down type in which the side wall panels of the body may be easily interchanged to permit selectively disposing either the smooth surface or the ribbed surface of the side panels toward the exterior of the vehicle body.

In achievement of these objectives, this invention provides a vehicle body construction having longitudinally extending side wall panels provided at their opposite ends with angle members which are detachably connected to front and rear corner posts. The relation of the angle members to the corner posts is such that the side wall panels may have the orientation of their ribbed and smooth surfaces reversed with respect to the exterior of the vehicle body. This reversal is accomplished by maintaining a given panel in the same orientation but merely reversing the side of the body to which it is attached. Also, the floor and roof structures of the vehicle are provided with bolt receiving apertures which mate with corresponding apertures of either side wall to facilitate the interchangeability of the side walls.

Further objects and advantages of the invention will become apparent from the following description taken in conjunction with the accompanying drawings in which:

Fig. 1 is a perspective view of a commercial vehicle having a demountable or knock-down body in accordance with the invention, the body being shown with the ribbed surface disposed toward the exterior of the body;

Fig. 2 is a side elevation view of the vehicle body of Fig. 1, partially broken away;

Fig. 3 is a top plan view, partially broken away, of the vehicle body of Figs. 1 and 2;

Fig. 4 is a view in vertical section along line 4—4 of Fig. 2 looking toward the rear of the vehicle body from the front;

Fig. 5 is a view in vertical section along line 5—5 of Fig. 2 illustrating the details of the attachment of the roof of the truck body to the side walls when the ribbed surface of the side walls is disposed outwardly;

Fig. 6 is an enlarged view in horizontal section of the front corner post and attached side wall at the left side of the vehicle, as seen in Fig. 3, with the ribbed surface of the side wall disposed outwardly;

Fig. 7 is an enlarged view in horizontal section of the rear corner post and attached side wall at the left side of the vehicle, as seen in Fig. 3, with the ribbed surface of the side wall disposed outwardly;

Fig. 8 is a view in vertical section along line 8—8 of Fig. 2 illustrating the attachment of the side wall to the floor of the truck body when the ribbed surface is disposed outwardly;

Fig. 9 is a top plan view, partially broken away, of a truck body having the smooth surface of the side walls disposed outwardly;

Fig. 10 is a view in vertical section along line 10—10 of Fig. 9 showing the manner of attachment of the roof to the side wall when the smooth surface is disposed outwardly; and Figs. 11, 12, 13 are respectively similar to Figs. 6, 7, 8 but show the attachment of the various members with the smooth surface of the side wall disposed outwardly.

Referring now to the drawings and more particularly to Figs. 1-8, inclusive, there is shown a vehicle of the commercial type having a body generally indicated at 20 which is formed of prefabricated panels and other components made of a light-weight metal, such as aluminum, for example. The body 20 is supported with respect to the chassis of the vehicle by a pair of spaced longitudinally extending beam members 22 attached to the vehicle chassis. A plurality of cross-sill members 24 (Fig. 2) are attached to the upper surface of beam members 22. Cross-sill members 24 are not provided in the intermediate region of the length of the chassis but extend at spaced intervals for substantial distances from either end of beams 22. An angle member 26 extends longitudinally for substantially the entire length of the vehicle body along the outer edges of the cross sills. The horizontal leg of each angle 26 overlies the upper edges of the cross-sill members 24 while the vertical leg of the angle extends downwardly in abutting relation to the outer end edges of cross-sill members 24 on the respective side of the vehicle. A pair of lower angle members 28 and 30 extend in aligned relation from adjacent opposite ends of the truck chassis, but are longitudinally spaced from each other adjacent the middle portion of the length of the chassis. The horizontal leg of each of the lower angle members 28 and 30 is welded to the lower edge of the cross-sills 24 while the vertical leg of each angle member 28 and 30 extends downwardly below the cross-sills.

A floor 32 formed of one or more transversely extending panels made of wood, aluminum or other suitable material and lying in abutting relation to each other is supported by the upper surface of the oppositely disposed longitudinally extending angle members 26.

At the rear of the floor structure just described, a cross-member 34 (Fig. 1) is supported by the ends of beams 22. The upper edge of cross-member 34 is in abutting relation to the under-surface of the floor 32 and is rigidly secured thereto as by welding. The opposite ends of cross-member 34 extend laterally a short distance beyond the outer edges of the floor 32 and also beyond the outer edges of cross-sills 24 and of angle members 26, 28 and 30.

A front crosspiece, similar to the rear crosspiece 34 shown in Fig. 1, is supported by the front ends of beams 22 and has its upper edge in abutting relation and secured to the under-surface of the forward end of floor 32. The opposite ends of the front crosspiece are flush with the side edges of the floor.

The truck body includes a pair of oppositely disposed side walls generally indicated at 36 and 38 formed of a plurality of panels of aluminum or other light-weight material joined to form a single composite side wall member. Each of the side walls 36 and 38 has a smooth surface 40 and 42, respectively, and a surface 44 and 46, respectively, provided with longitudinally spaced ribs or side posts 48. Each side post or rib member 48 extends for the entire height of the respective side wall to which it is attached and comprises a member which is channel-shaped in cross section with flange portions attached, as by riveting, to the side walls 36 and 38.

At the opposite ends of the side wall 36 and extending laterally outwardly from the ribbed surface 44 are front and rear angle members 50 and 56. As best seen in Fig. 6, front angle member 50 includes a longitudinally extending leg 52 which is riveted or otherwise rigidly secured to ribbed surface 44 and a leg 54 which extends perpendicularly to surface 44. Rear angle member 56, as best seen in Fig. 7, includes a longitudinally extending leg 58 which is riveted or otherwise rigidly secured to the ribbed surface 44 of side wall 36 and a leg 60 which extends perpendicularly to surface 44. Similarly, front and rear angle members 51 and 57, respectively, extend laterally from opposite ends of the ribbed surface 46 of side 38. As best seen in Fig. 11, front angle member 51 includes a longitudinally extending leg 53 which is rigidly connected, as by riveting, to the ribbed surface 46 of side 38 and a transversely extending leg 55 which extends perpendicularly from surface 46. Rear angle member 57, as best seen in Fig. 12, includes a longitudinally extending leg 59 which is riveted or otherwise rigidly secured to ribbed surface 46 of side 38 and a transverse leg 61 which extends perpendicularly to surface 46.

Each of the walls 36 and 38 has secured to substantially the entire length of its upper edge, as by riveting, a longitudinally extending angle member 62 (Figs. 5, 10) having a vertical leg which extends downwardly along the smooth surface 40 or 42 of the side wall and a horizontal leg which rests upon the upper edge of the side wall and serves as a support for the roof of the vehicle, as will be described later.

A pair of front corner posts 64, 65 are provided at the opposite sides of the front of the truck body, as best seen in Figs. 3, 6, and 11. Each of the corner posts 64, 65 comprises a member of hollow cross section having a curved outer body portion 66 to the opposite ends of which are integrally connected flat web portions 68 and 70 which extend inwardly in a transverse direction and in planes parallel to each other. The curvature of body portion 66 is such that the junction between the inner end of the body portion 66 and the outer edge of the web portion 68 lies in substantially the same plane as the inner edge of web 70.

At the rear of the truck body, a pair of corner posts generally indicated at 72, 73 are provided on each side of the vehicle body. Each of the corner posts 72, 73 is of generally hollow channel shape in cross section and comprises a flat outer web portion 74 which extends transversely of the vehicle body, and a pair of short longitudinally extending sides 76 and 78. To the inner edge of side 76 is connected a laterally inwardly extending web portion 80 and to the inner edge of side 78 is connected a laterally outwardly extending web portion 82. The lower end of each rear corner post 72, 73 overlaps rear cross-piece 34 and is bolted thereto.

The transverse legs 54 and 55 of front angle members 50, 51, respectively, are each provided substantially midway of their transverse width with a vertical row of pre-drilled holes which interchangeably engage corresponding drilled holes of the transverse leg 70 of either of the front corner posts 64 or 65. Similarly, the transverse legs 60, 61 of the rear angle members 56, 57 of the respective opposite sides 36, 38, are each provided after the assembly operation has been completed, as will be described later, with a vertical row of holes which may interchangeably engage corresponding drilled holes of the transverse leg 80 of either of the rear corner posts 72 or 73.

The truck body also includes a front wall generally indicated at 84 formed of a panel or panels of the same light-weight metal, such as aluminum, as is used for the side walls 36 and 38. Front wall 84 is provided with an outwardly disposed surface 86 having laterally spaced side posts or ribs 48, as in the case of the side walls. The ribbed surface 86 of front wall 84 remains disposed outwardly at all times regardless of the orientation of the ribbed wall surfaces 44 and 46 of the side wall members. The front corner posts 64 are attached to the front wall 84 by riveting or otherwise suitably securing the web portions 68 of the respective front corner posts 64 to the outer edge portions of the front wall surface 86. The lower portion of front wall 84 is bolted to the front crosspiece which is disposed below floor 32.

The truck body also includes a roof generally indicated at 88. Roof 88 is formed of a plurality of transversely extending panel sections of sheet metal connected in abutting relation to form a single composite panel member 90. Downwardly curved roof rails 92 are joined to the longitudinal and transverse edges of the roof panel 90, the longitudinally and transversely extending roof rails 92 being joined at the corners by corner roof caps 94.

Each of the roof rails 92 has integrally connected thereto a horizontally extending web portion 96 which projects laterally inwardly and is adapted to rest on the horizontal arm of angle member 62 (see Fig. 5). Each roof rail 92 and roof cap 94 also terminates at its lower end with an inwardly curved web member 98 which is bolted to the upper end of the respective side wall 36 or 38.

At the rear of the truck body, a pair of swinging doors 100 are hinged to the web portions 74 of the rear corner posts 72, 73. A suitable locking means generally indicated at 102 is provided to maintain the doors 100 in locked condition when desired.

When the ribbed surfaces 44 and 46 of the side walls 36 and 38 are disposed outwardly as shown in Figs. 1-8, inclusive, the front angle members 50 and 51 of the respective sides are attached by means of removable couplings, such as bolts 63, to the web portions 70 of the respective front corner posts 64, 65. The rear angle members 56, 57 are similarly attached by bolts 63 to the rear corner posts 72, 73. The ribbed surfaces 44 and 46 are substantially even with the inner edge of web portions 70 of front corner posts 64 and 65 and the opposite or rear ends of ribbed surfaces 44 and 46 are spaced inwardly an equal distance from the outer side 76 of each rear corner post 72, 73. The mating pre-drilled bolt-receiving apertures of leg 54 of front angle member 50 and of the web portion 70 of the front corner post 64 are in aligned mating relation. Similarly, mating bolt receiving apertures are provided in leg 60 of rear angle 56 and in web portion 80 of rear corner post 72.

At the opposite side of the vehicle body, the predrilled bolt-receiving apertures of transverse leg 55 of front angle member 51 of side 38 are in aligned mating relation with the corresponding apertures of transverse leg 70 of front corner post 65. Also, mating bolt-receiving apertures are provided in the transverse leg 61 of rear angle member 57 of side 38 and in web 80 of rear corner post 73.

As best seen in Fig. 8, the lower end of the side walls 36, 38 extends downwardly below the floor level and below the cross-sills 24 to a level substantially even with the lower edge of the lower angle members 28 and 30. Bolts 108 extend through the outwardly disposed ribbed surface 44 or 46 at closely spaced intervals and pass through aligned apertures in the vertical leg of the angle 26 at the respective side of the vehicle body. Also, bolts 110 pass through closely spaced apertures adjacent the lower edge of wall surface 44 or 46 and through correspondingly aligned apertures in the vertical legs of the angle members 28 and 30.

The horizontally extending web portion 96 of the roof cap members 92 and 94 lies in superposed relation to the horizontal leg of angle member 62 when the roof 88 is in position, as shown in Fig. 5.

The inwardly curved web portions 98 (Fig. 5) of the roof cap sections 92 and 94 are secured by bolts 112 to the upper portions of the side walls 36 and 38. Bolts 112 pass through aligned apertures in web portion 98, ribs 48, and sides 36, 38.

The transversely extending roof cap 92 at the rear of the roof has its corresponding inwardly curved web portion 98 rigidly connected to a downwardly extending cross-member 114 (Fig. 1) which is also secured to the upper portions of the webs 74 of the opposite rear corner posts 72, 73. Cross-member 114 thereby serves as a means of securely anchoring the rear end of the roof to the rear corner posts.

As shown in Figs. 9–13, side walls 36 and 38 may have their respective smooth surfaces 40 and 42 disposed outwardly with respect to the vehicle body. This is accomplished, in effect, by maintaining the side walls 36 and 38 in the same orientation as shown in Figs. 1–8, inclusive, but merely reversing the side of the body to which the respective side wall members are attached. With the smooth surfaces 40 and 42 disposed outwardly, side wall 36 is connected to front and rear corner posts 65, 73, while side wall 38 is connected to front and rear corner posts 64, 72. As best seen in Fig. 11, transverse leg 55 of front angle 51 of side 38 is bolted to transverse leg 70 of front corner post 64. Transverse leg 61 of rear angle member 57 of side 38 is bolted to transverse leg 80 of rear corner post 72. In a similar manner, transverse leg 54 of front angle member 50 of side 36 is bolted to transverse leg 70 of front corner post 65 and transverse leg 60 of rear angle member 56 of side 36 is bolted to transverse leg 80 of rear corner post 73.

As shown in Fig. 10, with smooth surfaces 40 and 42 disposed outwardly, roof 88 is secured to side walls 36 and 38 by passing bolts 112 first through smooth surface 40 or 42 of the respective side walls and then through side posts or ribs 48 which now project inwardly. The web portion 96 connected to roof cap 92 rests on the upper surface of the horizontal leg of angle member 62. In this case, the vertical leg of angle member 62 is disposed on the exterior of the wall 36 or 38 while the horizontal leg extends transversely inwardly in the same direction as side posts 48.

As best shown in Fig. 13, with the smooth surface 40 or 42 disposed outwardly of the vehicle body, the lower end of side wall 36 or 38 is connected to the floor structure of the vehicle body by bolts 116 which pass through the sheet metal wall 36 or 38 from the exterior surface thereof and through the vertical leg of longitudinally extending angle member 26. A spacer bushing member 118 surrounds the portion of the bolt 116 between the inner surface 44 or 46 of wall 36 or 38 and the outer surface of the vertical leg of angle member 26. Similarly, walls 36 and 38 are connected to the lower angle members 28 and 30 by means of bolts 120 which pass from the exterior surface of the wall and through the vertical legs of angles 28 and 30. Spacer bushings 122 are positioned on bolts 120 between the inner surface 44 or 46 of wall 36 or 38 and the outer surface of the angles 28 and 30.

When the sides 36 and 38 are transposed to permit selectively disposing the smooth or ribbed wall surfaces exteriorly of the body, the predrilled holes of the front angle members 50, 51 are properly aligned with the mating apertures of either front corner post 64, 65. In like manner, the rear angle members 56, 57 engage either of the rear corner posts 72, 73 in proper mating relation. Also, the apertures in webs 98 of roof cap sections 92 properly engage the apertures in ribs 48 of either side 36 or 38 for receiving bolts 112 (Fig. 5). Also, the bolt receiving apertures of the floor structure are so spaced as to properly mate with corresponding apertures of either side wall.

The vehicle body hereinbefore described may be assembled in the following manner, assuming that the ribbed surfaces 44, 46 are disposed outwardly. A generally similar procedure is followed when the smooth surfaces 40, 42 are disposed outwardly.

The first assembly step is to assemble the front 84 to the floor structure. This assembly operation is accomplished by clamping the lower end of front 84 to the lower front crosspiece, the clamps engaging posts 48 of front 84. Before clamping, the sides of front 84 are adjusted to be even with the side edges of the floor and the bottom of the front is adjusted to be parallel to the bottom of the crosspiece.

The next assembly operation is to clamp the sides 36 and 38 in place. With the lower edges of each of the sides 36 and 38 even with the bottom edges of angles 28 and 30, the sides are clamped to the lower angle members 28 and 30 by means of clamps which engage the vertical legs of angle members 28 and 30 and which also engage the posts 48. Before clamping, it should be ascertained not only that the bottom edges of the side walls 36 and 38 are parallel with the bottom edge of the angles 28 and 30 but also that the front angle members 50, 51 and the rear angle members 56, 57 of the sides 36 and 38 are properly aligned with respect to the front and rear corner posts 64, 65 and 72, 73. With the side walls 36 and 38 clamped in position as just described, the predrilled holes in the web portions 70 of forward or front posts 64, 65 should line up with the predrilled holes in the front angles 50, 51. Bolts 63 should then be inserted through the aligned holes in front angles 50, 51 and front corner posts 64, 65 but should not be tightened at this stage in the assembly operation.

The next assembly operation is to position bolts 108 and 110 through predrilled holes in the lower portions of the side walls 36 and 38 and in angle members 26, 28, 30 to secure the side walls to the angle members 26, 28 and 30. Bolts should also be inserted through aligned predrilled holes in the lower portion of front wall 84 and the lower front crosspiece. The bolts 63 which connect the front angle members 50, 51 to front corner posts 64, 65 may now be tightened.

Longitudinally extending rub rails (not shown) may now be attached to the outer surface of the sides 36 and 38 to protect the lower portions of the vehicle walls against damage from bumping or rubbing to which these wall portions are subjected. The rub rails are in abutting relation to the outer edge of side posts 48 when the ribbed surfaces of the body are disposed outwardly and in abutting relation to smooth surfaces 40 and 42 when the smooth surfaces are disposed outwardly.

The next assembly step is to assemble the roof 88 to the body. The front of the roof is set in place first and the rear of the roof is then forced downwardly so that the rear corner posts 72, 73 slip into the roof cap members 94. In forcing the rear portion of the roof downwardly, a screw driver or similar tool may be inserted between the corner roof cap 94 and the rear corner posts 72, 73 to assist in properly engaging the roof cap with the corner posts. When the roof is completely down in position, holes are drilled in the inwardly curved web portions 98 of the roof rails 92 and through the side posts 48 to permit insertion of bolts 112 as seen in Figs. 5 and 10. The back cross-member 114 which was connected to the rear end roof rail 92 of the roof prior to assembly of the roof, is bolted to the rear corner posts 72, 72. The door hinges are then secured to the rear corner posts 72 and the doors 100 are secured in position. The door latch 102 is then installed.

After all of the assembly steps just described have been completed, the body is squared and the rear angles 56, 57 and rear corner posts 72, 73 are drilled and bolted.

It can be seen from the foregoing that there is provided in accordance with this invention a vehicle body formed of prefabricated sheet metal components which may be easily assembled to provide a sturdy, light-weight body. Furthermore, the construction of the side walls and the corner posts and their relation to each other is such that the side walls may be readily interchanged to permit either the ribbed surface or the smooth surface of the side walls to be disposed exteriorly of the vehicle body. Also the manner in which the side walls are bolted to the roof and to the floor structure permits easy reversal of the sides, the bolt-receiving apertures of the roof and floor structure mating with corresponding apertures of either side wall.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. A vehicle body of the commercial type comprising a floor structure, corner post members extending vertically upwardly from the front and rear corners of said floor structure, side walls extending on each side of said body between a front corner post and a rear corner post, each of said side walls having a smooth surface and a ribbed surface, means connected at each end of each side wall and respectively detachably connecting each side wall to a front corner post and to a rear corner post, said means at a given end of each side wall being respectively engageable with either of the opposite corner posts at the same end of said vehicle, a given side wall having opposite surfaces disposed outwardly of said vehicle when attached to corner posts on opposite sides of said vehicle.

2. A vehicle body of the commercial type comprising a floor structure, corner post members extending vertically upwardly from the front and rear corners of said floor structure, side walls extending on each side of said body between a front corner post and a rear corner post, each of said side walls having a smooth surface and a ribbed surface, means permanently connected to front and rear ends of each of said side wall members and detachably engaging a corner post at the same end of said body, the means at a given end of a side wall being engageable with either of the corner posts at the corresponding end of said body to permit either the ribbed surface or the smooth surface of the given side wall to be disposed exteriorly of the vehicle body.

3. A vehicle body of the commercial type comprising a floor structure, corner post members extending upwardly from front and rear corners of said floor structure, side walls extending on each side of said vehicle body between a front corner post and a rear corner post, each of said side walls having a smooth surface and an opposite surface with a plurality of spaced post members, a front and a rear angle member rigidly connected at each end of each side wall, each front and rear angle member being respectively engageable with either of the opposite corner posts at the corresponding end of the vehicle body, and coupling means detachably connecting each angle member to a corner post at the corresponding end of the vehicle body.

4. A vehicle body of the commercial type comprising a floor structure, corner post members extending upwardly from front and rear corners of said floor structure, side walls extending on each side of said vehicle body between a front corner post and a rear corner post, each of said side walls having a smooth surface and an opposite surface with a plurality of spaced post members, front and rear angle members rigidly connected at opposite ends of each side wall, each angle member being detachably engageable with either of the corner posts at the end of the vehicle corresponding to the given angle member to permit interchangeably connecting each side wall to either side of said vehicle body, a roof structure for said body having downwardly extending flange portions, said flange portions being detachably connected to the upper ends of the respective side walls by means of detachable connecting means extending through the ribs of the side walls, the lower ends of said side walls being detachably connected to said floor structure.

5. A vehicle body of the commercial type comprising a floor structure, corner post members extending upwardly from front and rear corners of said floor structure, side walls extending on each side of said vehicle body between a front corner post and a rear corner post, each of said side walls having a smooth surface and an opposite surface with a plurality of spaced post members, front and rear angle members rigidly connected at opposite ends of each side wall, each angle member being detachably engageable with either of the corner posts at the end of the vehicle corresponding to the given angle member to permit interchangeably connecting each side wall to either side of said vehicle body, a roof structure for said body having downwardly extending flange portions, said flange portions being apertured at spaced intervals for receiving bolt-like detachable coupling means, the ribs of each side wall being provided with apertures mating with the apertures of said ribs for receiving said coupling means, the apertures in the ribs of a given side wall mating with the apertures of the flanges on either side of the vehicle body when said side walls are interchanged, the lower ends of said side walls being detachably connected to said floor structure.

6. A vehicle body comprising a rectangular floor structure, front corner posts mounted at each of the front corners of said floor structure, a rearwardly facing vertical web on each of said front corner posts projecting transversely outwardly from the associated side edge of said floor structure, rear corner posts mounted at each of the rear corners of said floor structure, a forwardly facing vertical web on each of said rear corner posts projecting transversely outwardly from the associated side edge of said floor structure, a pair of side panels, each of said side panels comprising a sheet-like main body portion, a front angle member rigidly secured by one web to one surface of said body portion along the front edge thereof, a rear angle member rigidly secured by one web to said one surface of said body portion along the rear edge thereof, the respective other webs on the front and rear angle members projecting equally transversely in the same direction from said one surface, and means for securing said other webs of said angle members in face to face relationship with said webs on the respective front and rear corner posts, the transverse width of said other webs on said angle members being equal to the transverse widths of said webs on said corner posts whereby said side panels may be mounted with said one surface thereof selectively facing either inwardly or outwardly of said body.

7. A vehicle body as recited in claim 6 wherein a plurality of ribs are disposed upon said one surface of each of said side panels, said ribs projecting from said side panels by a transverse distance equal to the transverse widths of said other webs of said angle members.

8. A vehicle body as recited in claim 6 including an upper angle member secured by one web along the upper edge of each of said side panels, and a downwardly facing web member extending between the front and rear corner posts on each side of said body, said downwardly facing web being secured in face to face relation with the other web of said upper angle member.

References Cited in the file of this patent

UNITED STATES PATENTS

| | | |
|---|---|---|
| 2,100,323 | Fitch | Nov. 30, 1937 |
| 2,502,703 | Chaplin | Apr. 4, 1950 |

FOREIGN PATENTS

| | | |
|---|---|---|
| 732,191 | Great Britain | June 22, 1955 |